May 25, 1926.

C. H. DESAUTELS 1,585,900

BEAD CORE AND MANUFACTURE THEREOF

Filed Nov. 6, 1923

INVENTOR
Charles H. Desautels
BY Edward C. Taylor
ATTORNEY

Patented May 25, 1926.

1,585,900

UNITED STATES PATENT OFFICE.

CHARLES H. DESAUTELS, OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

BEAD CORE AND MANUFACTURE THEREOF.

Application filed November 6, 1923. Serial No. 673,084.

This invention relates to improvements in bead fillers of the general type shown in the patent to Dowse 1,174,238 dated March 7, 1916, in which the plies of the tire carcass are folded around a filler substantially triangular in form and composed of an inextensible base preferably consisting of a plurality of wire cables, and a body portion of more elastic material such as rubberized fabric. The invention likewise relates to a method whereby the improved bead filler may be made. The manner in which are attained the several objects of simplicity, economy, strength, and facility of manufacture, will appear in the following description.

Referring now to the drawings.

In manufacturing the improved bead filler an annular fabric strip 10 is employed; provided with a coating of rubber, preferably applied thereon by calendering, which will bond the completed bead filler into a coherent whole upon the application of shaping pressure, and will stiffen the bead and bond it to the casing upon vulcanization. The thickness of the coating should be sufficient to provide rubber to close the interstices which would otherwise exist in the finished bead, this thickness therefore depending on the shape and size of the bead to be built.

Encircling this annular strip, which is of the peripheral length of the base of the tire bead desired, are then placed a plurality (two as shown) of inextensible strands 11, formed endless and ring shaped. The location of the endless strands is such that free marginal portions 12 of the fabric are provided, the strands being also spaced apart at a greater distance than in the finished bead. The marginal portions 12 are now folded over on the main body of the fabric, so as to enclose the strands and to meet in the center. A slight crowned form is given to the fabric by stretching the center slightly at 13, preferably during the folding step, in order to facilitate the next operation.

Figure 1:
Fig. 1 is a sectional view of a fabric strip.
Figure 2:
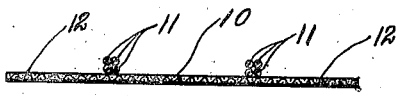
Fig. 2 is a similar view showing the application of the inextensible strands.
Figure 3:
Fig. 3 is a similar view showing a later stage of manufacture.
Figure 4:
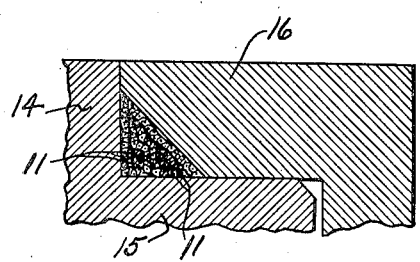
Fig. 4 is a sectional view of the bead filler ready for incorporation into the tire casing, showing also one manner of compacting and shaping the bead to get it into final form.
Figure 5:
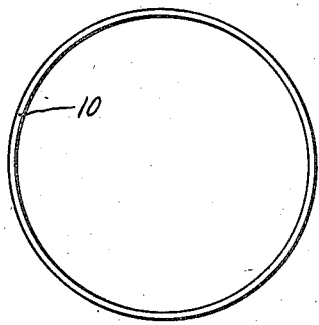
Fig. 5 is a side view, on a smaller scale, of the completed bead, illustrating its form as an endless ring.

With the inextensible strands enclosed in the folds of the fabric the assembly is now ready to be shaped to the form in which it is to be incorporated in the tire carcass. In the usual type of tire casing the bead filler is roughly of the shape of a right triangle. Although the invention is not limited to the production of bead fillers of this cross-sectional form, it will be referred to for convenience in the following description. Due to the arch shape given to the assembly during the folding operation the central spar of doubled fabric has a tendency to buckle outwardly if the strands 11 are pressed together. This property is availed of in shaping the bead to triangular form. In Fig. 4 is shown a partial section of a mold by which this shaping may be accomplished, it being understood that the mold would be in annular form, through one side only of which is the section taken. What may be termed the anvil part of the mold has a cylindrical part 14 wide enough to receive the assembly of Fig. 3, and a surface 15 at right angles thereto. Over the cylindrical surface 14 slides the second part 16 of the mold, this being provided with a slanting end surface adapted to form the hypothenuse of the triangular filler. As the mold is closed the buckling—initiated in the stage of manufacture shown in Fig. 3—of the central part of the fabric 10 will continue with the final result shown in Fig. 4. The unvulcanized rubber coating of the fabric being plastic and adhesive a compression of short duration in the mold will be sufficient to set the bead in its shaped form. If desired, lettering may be applied to the bead by suitable engraving of the mold parts, so as to designate for example the style and size of the bead fillers so made. Heating is not necessary in the shaping operation, as the rubber possesses its properties of plasticity and adhesiveness even when cold. I prefer for convenience and economy to give only a cold pressure to the bead, leaving vulcanization to be accomplished after it has been assembled with the rest of the elements into the tire casing.

Having thus described my invention, I claim:

1. A bead filler having a base portion composed of a plurality of inextensible annular strands, each strand being covered with sheet material, and a flexible body portion extending outwardly from said base portion and formed solely by shaping portions of said covering material.

2. A bead unit for use in the manufacture of bead fillers, comprising a plurality of spaced inextensible annular strands and a bridge of flexible material joining the strands and crowned outwardly between them, whereby the strands are adapted to be foreed together leaving an ootwardly extending portion of said material.

3. A bead filler composed of a plurality of inextensible annular strands located in the base portion thereof, and a covering of sheet material extending around the strands and looped between them, the looped portion of the material being compacted into a triangular body portion of the filler.

4. A method of making a bead filler comprising enclosing a plurality of inextensible annular strands in a sheathing of sheet material with the latter extending outwardly between the strands, and compacting the strands and material to form a bead filler.

CHARLES H. DESAUTELS.